(12) United States Patent
Dreher

(10) Patent No.: US 12,240,198 B2
(45) Date of Patent: Mar. 4, 2025

(54) PRESSING DEVICE, PRESSING SYSTEM AND METHOD FOR PROVIDING A BALE PRESSED FROM PLANT MATERIAL

(71) Applicant: Ingo Dreher, Balgheim (DE)

(72) Inventor: Ingo Dreher, Balgheim (DE)

( * ) Notice: Subject to any disclaimer, the term of this patent is extended or adjusted under 35 U.S.C. 154(b) by 193 days.

(21) Appl. No.: 17/891,403

(22) Filed: Aug. 19, 2022

(65) Prior Publication Data

US 2023/0001661 A1    Jan. 5, 2023

Related U.S. Application Data

(63) Continuation of application No. PCT/EP2021/052207, filed on Jan. 29, 2021.

(30) Foreign Application Priority Data

Feb. 20, 2020   (DE) ................... 10 2020 104 515.8

(51) Int. Cl.
*B30B 9/30* (2006.01)
*A01F 15/04* (2006.01)

(52) U.S. Cl.
CPC ........... *B30B 9/3096* (2013.01); *A01F 15/04* (2013.01); *B30B 9/3014* (2013.01)

(58) Field of Classification Search
CPC ........ B30B 9/30; B30B 9/301; B30B 9/3028; B30B 9/3092; B30B 9/3078;

(Continued)

(56) References Cited

U.S. PATENT DOCUMENTS 1,181,497 A    5/1916   Wilder
3,693,541 A    9/1972   Lombard et al.
(Continued)

FOREIGN PATENT DOCUMENTS

DE    44 33 587 A1    3/1996
DE    195 31 240 A1    2/1997
(Continued)

OTHER PUBLICATIONS

International Standard, Norm ISO 668, Series 1 freight containers—Classification, dimensions and ratings, Switzerland, Jan. 2020, 22 pages.

*Primary Examiner* — Jimmy T Nguyen
(74) *Attorney, Agent, or Firm* — ASLAN LAW, P.C.

(57) ABSTRACT

A pressing device for providing a bale from plant material, including a pressing chamber with a pressing space to which plant material can be supplied, a pressing element movable from an initial position into an end position with a drive apparatus for compressing the plant material, and a binding apparatus, wherein the pressing space is delimited laterally by a wall for forming a pressing box, and an abutment delimits the pressing space, against which abutment the plant material is compressible during the movement of the pressing element into a first partial bale, wherein the first partial bale provided in this manner is transportable through a transport opening of the pressing space into a following space, wherein at least one further partial bale, via the pressing element, can be provided by compressing further plant material introduced into the pressing space against at least one abutment arranged at the pressing chamber.

29 Claims, 8 Drawing Sheets

(58) Field of Classification Search
CPC ..... B30B 9/3096; B30B 9/3014; A01F 15/04; A01F 15/046; A01F 15/14; Y02E 50/10; Y02E 50/30; B65B 13/20; B65B 27/12
See application file for complete search history.

(56) References Cited

U.S. PATENT DOCUMENTS

| | | | |
|---|---|---|---|
| 4,170,934 A | 10/1979 | Oosterling et al. | |
| 4,240,245 A | 12/1980 | Oosterling et al. | |
| 4,466,345 A * | 8/1984 | Kaldenbach | B65B 27/12 100/31 |
| 4,711,078 A | 12/1987 | Schaible et al. | |
| 5,687,643 A * | 11/1997 | Felts | B65B 27/12 100/207 |
| 5,768,872 A | 6/1998 | Von Allworden | |
| 7,877,970 B1 | 2/2011 | Crosby | |
| 8,109,210 B2 * | 2/2012 | Strautmann | B30B 9/3014 100/215 |
| 2003/0226336 A1 | 12/2003 | Hunter et al. | |
| 2006/0230950 A1 | 10/2006 | Freihart | |
| 2010/0095854 A1 | 4/2010 | Strautmann | |
| 2015/0296714 A1 | 10/2015 | Dreher | |
| 2021/0001348 A1 | 1/2021 | Mitchell et al. | |

FOREIGN PATENT DOCUMENTS

| | | |
|---|---|---|
| DE | 10 2004 027 612 A1 | 1/2006 |
| DE | 20 2012 010 760 U1 | 2/2014 |
| DE | 10 2017 010 639 A1 | 5/2019 |
| EP | 0 803 183 A1 | 1/1997 |
| EP | 1 120 237 A2 | 1/2001 |
| EP | 1 606 992 A1 | 7/2005 |
| EP | 2 628 591 A2 | 8/2013 |
| EP | 3 524 047 A1 | 8/2019 |
| JP | S53 54536 A | 5/1978 |
| WO | WO 86/01974 A1 | 4/1986 |
| WO | WO 2003/071858 A1 | 9/2003 |
| WO | WO 2008/113531 A1 | 9/2008 |
| WO | WO 2014/067512 A1 | 5/2014 |

* cited by examiner

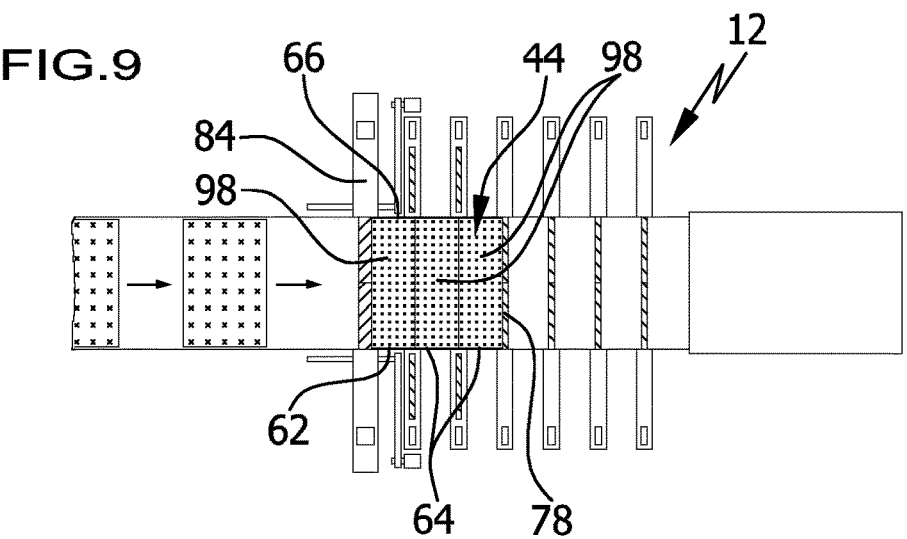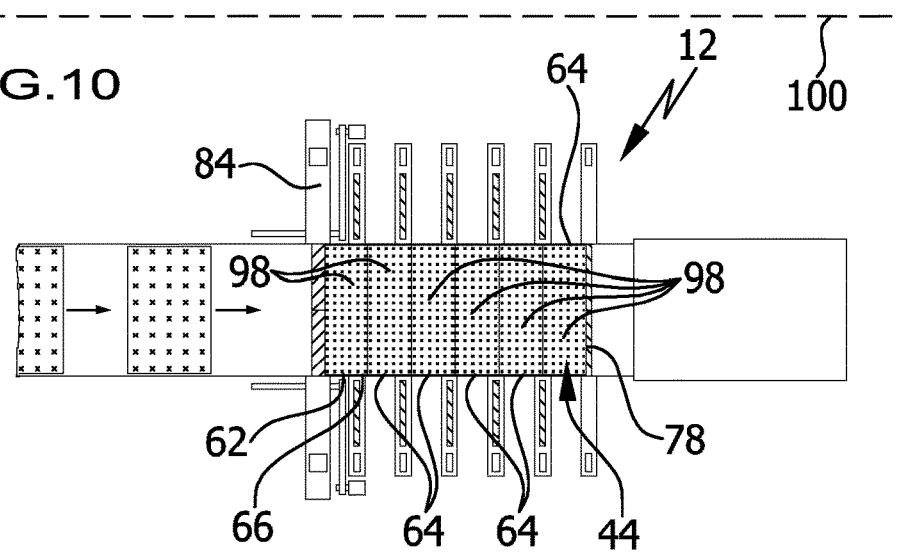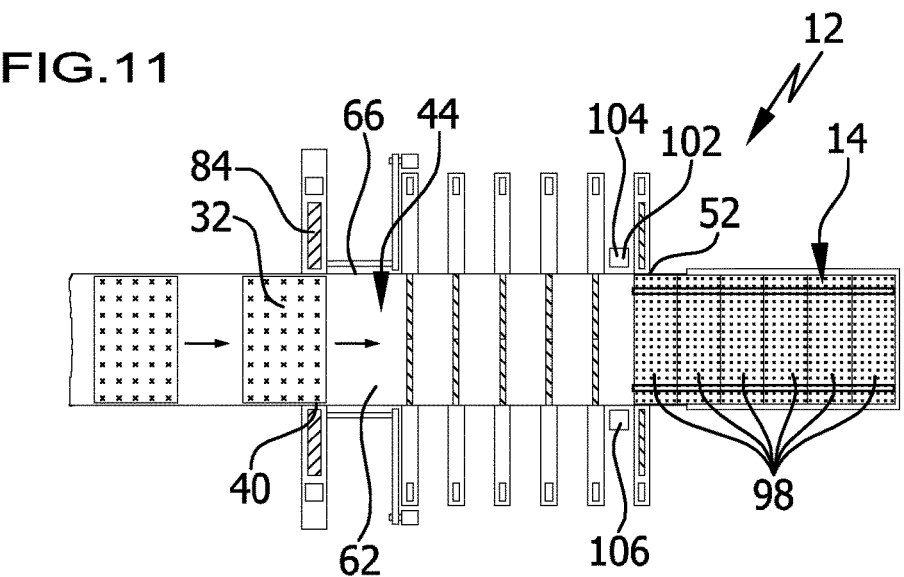

PRESSING DEVICE, PRESSING SYSTEM AND METHOD FOR PROVIDING A BALE PRESSED FROM PLANT MATERIAL

CROSS-REFERENCE TO RELATED APPLICATIONS

This application is a continuation application of international application number PCT/EP2021/052207, filed on Jan. 29, 2021, and claims the benefit of German application number 10 2020 104 515.8, filed on Feb. 20, 2020, which are incorporated herein by reference in their entirety and for all purposes.

FIELD OF THE INVENTION

The present invention relates to a pressing device for plant material, in particular long-stemmed plant material, for providing a bale made of the plant material, comprising a pressing chamber with a pressing space to which plant material can be supplied by means of a supply apparatus via a supply opening.

The present invention also relates to a pressing system with such a pressing device.

The present invention further relates to a method for providing a bale by means of a pressing device.

BACKGROUND OF THE INVENTION

A pressing device for long-stemmed plant material is described in WO 2014/067512 A1.

Further pressing devices for plant material are described in the documents U.S. Pat. Nos. 4,170,934, 4,240,245, EP 0 803 183 A1, US 2003/0226336 A1, EP 1 606 992 A1 and in DE 10 2004 027 612 A1. EP 1 120 237 A2 discloses a pressing device for short-cut fiber material, for example plastic fibers.

With regard to utilization of plant material as biomass, it is advantageous to compress the harvested plant material into bales for transport purposes and for storage. For this purpose, pressing devices are known in which the loose or pre-compressed plant material is introduced into a pressing space and compressed therein by means of a pressing element. The bale formed in this way is removed from the pressing space. Several bales can be transported together on a vehicle to the utilization location. In particular, gasification of the plant material with release of the energy content of the plant material is possible as utilization.

Different plants can be suitable for such utilization. However, reed (giant Chinese reed, *Miscanthus* x *giganteus*, hereafter simplified as "*Miscanthus*") and corn are particularly noteworthy. However, the present invention is not limited to use with one of these plants.

With regards to a subdivision of the harvested plant material into transport and energy units that are as similar as possible, WO 2014/067512 A1 proposes compressing the plant material to bales with a substantially constant volume and substantially constant density. As a result, it is possible to provide, to a certain extent, manageable "energy units" in the form of biomass.

*Miscanthus* and corn, in particular, have relatively long and thick stems, which is a challenge to overcome in the pressing operation. Compared to other plant material, for example straw, much higher forces are required for the compression operation for this reason, as the long stems are much more difficult to bend and, moreover, intertwine with each other. Higher pressing forces, however, require a greater dimensioning of the pressing device. However, this is contrary to the desire to make the pressing device mobile, if possible, so that the plant material can be compressed at the harvesting site, especially on the agricultural land itself, and does not have to be transported loosely to the pressing site.

Apart from the pressing device described in WO 2014/067512 A1, the pressing devices described in the other publications mentioned are not suitable for compressing long-stemmed plant material, in particular *Miscanthus* and corn, while achieving a degree of compression sufficient for economic utilization.

An object underlying the present invention is to provide a pressing device which has better compression properties for, in particular, long-stemmed plant material.

A further object underlying the present invention is to provide a pressing system with a pressing device and a method for providing a bale with a pressing device.

SUMMARY OF THE INVENTION

In a first aspect of the invention, a pressing device for plant material, in particular long-stemmed plant material for providing a bale made from the plant material, is provided. The pressing device comprises a pressing chamber having a pressing space to which plant material can be supplied by means of a supply apparatus via a supply opening, a pressing element movable from an initial position into an end position and having a drive apparatus for compressing the plant material, and a binding apparatus. The pressing space is laterally delimited by a pressing box, and an abutment delimits the pressing space, against which the plant material is compressible during the movement of the pressing element to form a first partial bale. A first partial bale provided in this way can be transported through a transport opening of the pressing space into a following space. At least one further partial bale can be provided by means of the pressing element by compressing further plant material introduced into the pressing space against at least one abutment arranged on the pressing chamber. The partial bales can be output via an output opening of the pressing chamber. The two or more partial bales are connectable to form a final bale by means of the binding apparatus.

In a further aspect of the invention, a pressing system with such a pressing device is provided.

In a further aspect of the invention, a method for providing a bale by means of a pressing device is provided.

BRIEF DESCRIPTION OF THE DRAWINGS

The foregoing summary and the following description may be better understood in conjunction with the drawing figures, of which:

FIGS. 3 to 11: show the pressing device from FIG. 2 at successive points in time when creating a plurality of partial bales and a final bale;

DETAILED DESCRIPTION OF PREFERRED EMBODIMENTS OF THE INVENTION

Figure 1:
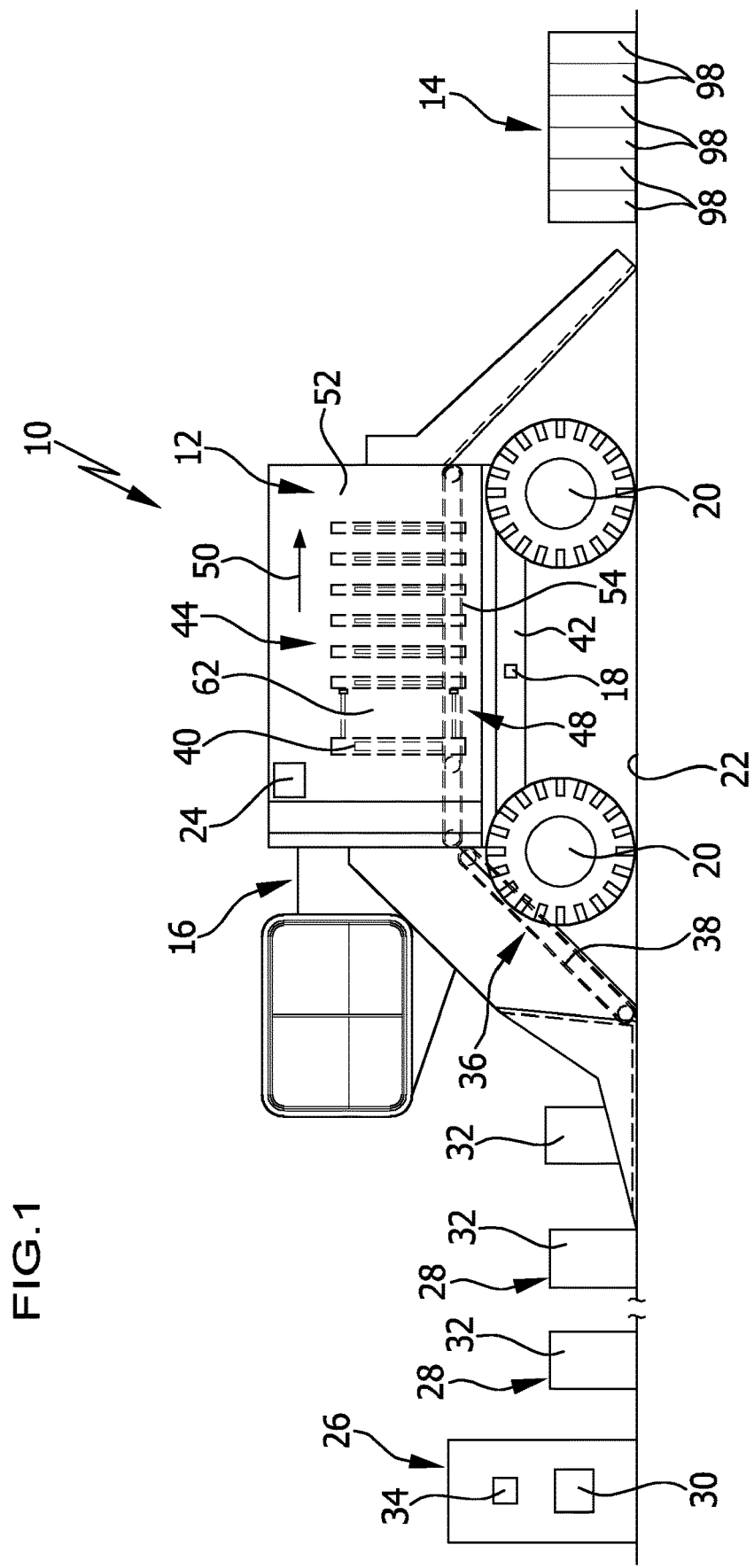
FIG. 1: shows a schematic illustration of a preferred embodiment of a pressing system in accordance with the invention, comprising a preferred embodiment of the pressing device in accordance with the invention, for carrying out a preferred exemplary embodiment of the method in accordance with the invention.

Although the invention is illustrated and described herein with reference to specific embodiments, the invention is not intended to be limited to the details shown. Rather, various modifications may be made in the details within the scope and range of the equivalents of the claims and without departing from the invention.

The present invention relates to a pressing device for in particular long-stemmed plant material for providing a bale made from the plant material, comprising a pressing chamber having a pressing space to which plant material can be supplied by means of a supply apparatus via a supply opening, a pressing element, which is movable from an initial position into an end position having a drive apparatus for compressing the plant material, and a binding apparatus, wherein the pressing space is laterally delimited by a pressing box, and an abutment delimits the pressing space against which the plant material is compressible during the movement of the pressing element to form a first partial bale, wherein a first partial bale provided in this way is transportable through a transport opening of the pressing space into a following space, wherein at least one further partial bale is providable by means of the pressing element by compressing further plant material introduced into the pressing space against at least one abutment arranged on the pressing chamber, wherein the partial bales are output via an output opening of the pressing chamber, and wherein the two or more partial bales are connectable to form a final bale by means of the binding apparatus.

In the present invention, consideration is given to the fact that the bales which are output by the pressing device—in the present case referred to as "final bales"—should have as uniform a size as possible with regard to economic utilization for energy production, wherein at the same time the highest possible compression is desirable for the use of size and/or weight capacities for transport. The present invention accordingly proposes to provide final bales by connecting individual partial bales, each of which is formed by compressing plant material. A first quantity of plant material is compressed in the pressing space to form a first partial bale and the latter is transported through the transport opening into a following space of the pressing chamber. Subsequently, at least one further partial bale is compressed, and the partial bales can be output from the pressing chamber via the output opening. The partial bales are connected to one another by the binding apparatus, wherein the binding apparatus is preferably arranged on the pressing chamber itself, as a result of which the bound final bale can be output from the pressing chamber.

With regard to the size of the partial bales being as uniform as possible, it is advantageous for the pressing chamber to comprise a pressing box which laterally surrounds the plant material, wherein preferably a rectangular shape is provided. By moving the pressing element from the initial position into the end position against the abutment, it is possible to achieve small tolerances with respect to the extension of the partial bale in the compression direction, so that a respective partial bale can be provided with relatively high compaction with simultaneously predefined dimensions with a small tolerance. Although the possibility could exist of achieving a comparable degree of compression with a relatively large pressing device in the case of large bales. However, the pressing device in accordance with the invention can be kept structurally compact so that it is preferably suitable for mounting on a vehicle with which an agricultural area can be directly driven over.

By connecting several partial bales into one final bale, a larger final bale is provided in relation to the partial bale. This offers the advantage that fewer (final) bales have to be handled overall during further processing, in comparison with a high number of smaller partial bales. Furthermore, by connecting two or more partial bales, binding material, in particular strapping material, is saved, since individual partial bales would also have to be bound in order to prevent the plant material from falling apart. The costs of individual bales can be reduced by saving binding material. Weight and space, which is obtained by saving binding material, can be converted to increase the final bales in order to utilize transport capacities as optimally as possible.

The pressing device advantageously comprises a transport apparatus, by means of which the partial bales are transportable from the pressing space into at least one following space and, for example, if present, into the further following spaces, up to the output opening of the pressing chamber. The transport apparatus can comprise, for example, a belt conveyor or a chain conveyor.

It is expedient for the partial bale and at least one further partial bale to be transportable from the pressing space to the output opening in a working direction of the pressing device. The working direction is preferably straight and defined by the pressing box.

It is advantageous if the abutment for providing the first partial bale and at least one further abutment for providing the at least one further partial bale are abutments which are different from one another, wherein at least one further abutment and the pressing box delimit the following space and the further plant material is compressible against the first partial bale supported on the at least one further abutment to form at least one further partial bale. After the transfer into the following space, the first partial bale can rest against the further abutment and be supported by it. The next partial bale is compressed by compressing the plant material against the first partial bale. This offers the advantage, for example, that the first partial bale is again subjected to a compression force in order to increase its dimensional stability.

It is expedient for the pressing device to comprise two or more following spaces arranged one behind the other in a working direction of the pressing device, and two or more abutments, wherein a respective abutment thereof delimits the respective following space against on which respective abutment the first partial bale can be supported during the formation of the further partial bales, and wherein the further plant material is compressible in the pressing space against the respective last-formed partial bale. After the formation of the second partial bale, wherein the first partial bale is supported against the abutment of the first following space, the first partial bale can be transported into a further following space and the second partial bale from the pressing space into the following space. The subsequent (third) partial bale can be compressed by compressing the plant material against the preceding partial bales. A respective following space has an abutment against which the first partial bale can rest in order to be supported by it. The respective last-formed partial bale forms, to a certain extent, the "abutment" for the compression of the subsequent plant material.

The partial bales can in particular rest against one another.

The pressing chamber preferably comprises the pressing space as a pressing chamber section and a respective one of the above-mentioned following spaces as further pressing chamber sections following the pressing space in the working direction, wherein the output opening of the pressing chamber for the partial bales is arranged on the last pressing chamber section in the working direction. In this way, a compact design of the pressing device can be achieved. In particular, the output opening for the final bale, which is already bound from the individual partial bales, is provided.

In a preferred implementation of the pressing device in practice, it can prove advantageous if a total of five following spaces are provided and the final bale comprises six interconnected partial bales.

It is advantageously provided that the abutment on the pressing space is an intermediate wall between the pressing space and the following space and is transferable by means of a drive apparatus from a closed position, in which the plant material is compressible against the intermediate wall, into an open position, in which the partial bale is transferable into the following space, and vice versa. The intermediate wall can assume a closed position, so that material can be compressed to the first partial bale against the intermediate wall. After the transfer into the open position, the partial bale can be transported into the following space.

It may be favorable if the abutment between adjacent following spaces is in each case an intermediate wall between the following spaces and is transferable by means of a drive apparatus from a closed position, in which the first partial bale is supportable against the intermediate wall, into an open position, in which the first partial bale is transportable into the next following space, and vice versa. In the closed position, the respective intermediate wall can form the abutment for the first partial bale. In the open position, the partial bale can be transported into the next following space.

It can be advantageous if the abutment at the last following space in the working direction is a closing apparatus of a rear wall of the pressing chamber and is transferable by means of a drive apparatus from a closed position closing the output opening of the pressing chamber, in which the first partial bale can be supported against the closing apparatus, into an open position releasing the output opening, in which the partial bales are transportable out of the pressing chamber. The last abutment in the working direction is formed by the closing apparatus on the last following space when the closing apparatus assumes the closed position. In the open position, the partial bales can be output from the pressing chamber via the output opening released in this way. Advantageously, the partial bales are previously joined to form the final bale in the pressing chamber.

The intermediate wall and the closing apparatus can, to some extent, be regarded as "bulkheads" between the pressing space, between the following spaces and the exit of the pressing chamber, after which a respective bale transport is made possible.

Advantageously, the intermediate wall or the closing apparatus is movable out of the pressing box as a whole or in individual, respectively movable segments transversely to the working direction for transfer from the closed position into the open position and vice versa. For example, the intermediate wall or the closing apparatus comprise two segments which can be pushed into the pressing box, and which can be displaced away from one another for releasing the pressing box.

It is advantageous if the abutment on the pressing space and at least one further abutment of at least one following space are stationary on the pressing device with respect to a movement in the working direction of the pressing device. As a result, a simple structural configuration of the pressing device can be achieved, in which, in particular, only the pressing element is to be moved in the working direction of the pressing device for the compression of plant material.

Preferred embodiments of the pressing device in accordance with the invention have been presented above in which the first partial bale is supported in each case on a different abutment.

In a different preferred embodiment of the invention, the abutment for providing the first partial bale on the pressing space and the at least one abutment for providing at least one further partial bale are identical, wherein each partial bale is formed by compression of the plant material in the pressing space against this abutment and is subsequently transported into the following space. Each partial bale can be compressed in the pressing space and then transferred through the transport opening into the following space. As a result, for example, a relatively simple design of the pressing device can be achieved.

It can be provided that a predetermined number of partial bales is collected in the following space and subsequently output through the output opening. For example, the partial bales are output as bound final bales through the output opening.

It may be favorable if the pressing device comprises two or more following spaces arranged one behind the other in a working direction of the pressing device, which are separated from one another by intermediate walls, wherein the next intermediate wall is released after a respective partial bale has been formed and the partial bales are transportable into the next following space. In this embodiment, the plant material can be compressed in each case against the abutment in the pressing space. The partial bales are transported further into a following space, which can be opened step by step by releasing the respective intermediate wall.

It is advantageous for the pressing box to have an identical or substantially identical cross-sectional area at the pressing space and at the following space, in particular on the two or more following spaces. As a result, the final bale has relatively small dimensional tolerances transverse to the longitudinal extension defined by the direction of the pressing box.

It is advantageous if the following space, in particular the two or more following spaces, is designed shorter than the pressing space in the working direction of the pressing device. The plant material that is already compressed into the partial bale does not have to be compressed any further. As a result, a compact design of the pressing device can be achieved by shortening the at least one following space in relation to the pressing space.

The partial bales in the pressing space are preferably formed with a predetermined or predeterminable path of the pressing element from the initial position into the end position and consequently preferably have a uniform length along the compression direction.

In particular, the partial bales are formed with a constant volume. For this purpose, as explained above, a constant or substantially constant cross-sectional area is preferably provided at the pressing box.

It proves advantageous if a length of at least one following space following the pressing space in the working direction, in particular a length of a respective following space, is equal to the length of the partial bales, defined by the range of movement of the pressing element from the initial position into the end position. This proves to be advantageous, for example, in the embodiment described above, in which the first partial bale is supported on the abutment of the following space in each case and is compressed against the last-formed partial bale. A substantially identical range of movement of the pressing element from the initial position into the end position for forming each partial bale can be used, wherein the partial bales simultaneously have a substantially identical length.

Advantageously, two or more following spaces are provided which are of equal length along the working direction of the pressing device, wherein preferably all the following spaces are of equal length.

It is advantageous if the final bales formed by the pressing device have dimensions which are adapted to standardized cargo devices. It is advantageous if the final bales are formed in such a way that the capacities for example of a standardized container or a cargo device with dimensions of such a container can be utilized as completely as possible.

Accordingly, it is advantageous, for example, if the pressing space in the end position of the pressing element has a length which corresponds to an integer fraction or approximately or substantially an integer fraction of an internal dimension of a container of the ISO standard 668 for container (i.e., internal dimension divided by an integer).

In a corresponding manner, it is advantageous if the pressing box has a width and/or a height which corresponds to an integer fraction or approximately or substantially an integer fraction of an internal dimension of a container of the ISO standard 668 for containers.

The container of the two last-mentioned embodiments can in particular be a 20-foot container or a 40-foot container of the standard ISO 668.

Ideally, the final bales are formed in the length, width and/or height such that an interior of a container in accordance with the standard ISO 668 can be filled with the plurality of final bales in a positive-locking manner. For this purpose, the pressing device is designed such that a respective integer fraction of the internal dimension in length, width and/or height corresponds to the dimensions or approximately or substantially the dimensions of the partial bales and/or the final bale.

It proves advantageous if the final bale has a length, a width and/or a height which corresponds to an integer fraction or approximately or substantially an integer fraction of an internal dimension of a container of the ISO standard 668 for containers, wherein the container is in particular a 20-foot container or a 40-foot container of the standard ISO 668.

In a preferred embodiment of the pressing device in accordance with the invention, a final bale of approximately 196 cm in length can be provided, for example, formed from six partial bales each being approximately 33 cm in length (or alternatively, for example, three partial bales each being approximately 65 cm in length). The width of the partial bales and of the final bale can, for example, be approximately 116 cm, the height for example approximately 79 cm. This provides the possibility, for example, to load a 20-foot ISO 668 standard container with three end bales in length, two end bales in width, and three end bales in height, for a total of 18 bales.

A pressing accuracy of 1% or less in length, with regard to optimal utilization of the transport capacities, proves advantageous.

The drive apparatus for the pressing element can be configured in different ways, for example mechanically, electrically, hydraulically, pneumatically or by a combination of two or more of the aforementioned properties.

It proves advantageous if the drive apparatus comprises at least one spindle drive, wherein spindles coupled to the pressing element are arranged laterally next to the supply opening. The spindles, which are electrically driven in particular, make it possible to achieve significantly higher compression compared to conventional connecting rod presses. While a density of the plant material of, for example, approximately 200 kg/m$^3$ can be achieved in conventional presses, a density of up to approximately 400 kg/m$^3$ can preferably be achieved by using spindle drives. In this way, for example, the capacities in terms of weight of commercially available transport apparatuses can be better utilized.

For example, four spindles can be provided which are coupled to the pressing element next to corner regions of the supply opening. By providing more than one spindle, in particular four spindles, tilting of the movement of the pressing element can be avoided. The spindles can have their own respective drive or be driven together.

It is advantageous if the pressing chamber comprises a front wall in which the supply opening is formed and which comprises or forms the pressing element, wherein a closing apparatus is provided, which can be transferred by means of a drive apparatus into an open position, for supplying the plant material into the pressing space, and which closes the supply opening in a closed position, and if the front wall is movable by means of the drive apparatus for compressing the plant material. When the closing apparatus is open, the plant material to be compressed can be introduced into the pressing space. If the closing apparatus assumes the closed position, the front wall is moved, and the plant material is compressed in the pressing space. In this way, a structurally simple configuration of the pressing device can be achieved.

The closing apparatus can be movable completely or in individual, respectively movable segments transversely to the working direction for transfer from the closed position into the open position and vice versa. For example, two segments are provided which are movable toward one another for closing the supply opening and which can be moved in directions pointing away from one another for releasing the supply openings.

In a preferred embodiment, the binding apparatus can be a strapping apparatus. In particular, all partial bales can be provided together with a strapping which encircles them.

It is advantageous if the binding apparatus is arranged at the pressing chamber and if the final bale can be provided in the pressing chamber by binding the partial bales. This makes it possible to connect the partial bales to one another already in the pressing chamber and to output only bound final bales from the pressing device, which can be handled more easily than the partial bales.

The binding apparatus advantageously comprises a first binding unit and a second binding unit which can be inserted into the pressing box from opposite sides. In this case, at least one strand or strap can preferably be provided by each binding unit, and the strands or straps of different binding units are connected to one another encircling the final bales. For example, the strands or straps are inserted transversely to the working direction into the pressing box and placed against one another before they are connected to one another in a force-locking and/or positive-locking manner.

The straps are, for example, metal straps which can be connected to one another in a force-locking and/or positive-locking manner. Possible joining techniques include clinching ("tox clinching"). The use of metal straps makes it possible to bind the final bales with a higher strength than, for example, with conventional baling twine. A length of the final bales by expansion of the plant material is avoided, as a result of which the final bales have a high dimensional stability.

It is evident that the pressing device advantageously comprises a control apparatus with which the active components of the pressing device can be controlled. These include in particular the drive apparatus for the pressing element, possible drive apparatuses for the intermediate wall, the intermediate walls or the closing apparatus, for the closing apparatus at the supply opening, the transport apparatus or the supply apparatus. Advantageously, the active components of the pressing systems mentioned below are also controllable by means of the control apparatus.

As already mentioned, the invention also relates to a pressing system. A pressing system in accordance with the invention, which achieves the object mentioned at the outset, comprises a pressing device of the above-mentioned type and a portioning apparatus upstream of the pressing device in the working direction, by means of which the pressing device can be provided with a pre-portioned amount of plant material for forming a respective partial bale.

The portioning apparatus makes it possible, in particular, to provide an interface between a continuously performable harvest of the plant material and a discontinuously operating pressing device. The plant material is collected and provided in pre-portioned amounts and can be supplied to the pressing space via the supply apparatus to form a respective partial bale.

It is advantageous if the pre-portioned amount of plant material is specifiable with respect to its volume and/or weight. For example, it can be provided that the pre-portioned amount is dimensioned such that it substantially fills out the pressing space. Alternatively or in addition, provision can be made for an amount of plant material to be determined with respect to its weight to be introduced into the pressing space, for example to form partial bales with identical weight.

It is advantageous for the portioning apparatus to comprise a compression unit for precompression of the pre-portioned amount of plant material, in particular in the form of a pre-bale. The loose plant material can be pre-compressed into a pre-bale. The pre-bale may for example be sized to fill the pressing space completely or substantially completely prior to compression.

It is advantageous for the pressing system to comprise at least one sensor apparatus by means of which a mass of the pre-portioned amount of plant material can be determined prior to introduction into the pressing space and in particular before a precompression. For example, a pre-defined mass of plant material is supplied to the compression unit, preferably in order to provide a pre-bale of predefined weight.

The pressing system can comprise at least one sensor apparatus with which a mass of a formed partial bale in the pressing chamber can be determined. In this way, the mass of a respective partial bale can be checked with regard to a process control.

The portioning apparatus is advantageously controllable depending on the determined mass of the partial bale for providing the pre-portioned amount of plant material. This provides, for example, the possibility of achieving a predetermined or predeterminable average density in the final bale. It could thus be that a partial bale has, for example, an excessively high or too low mass. When providing further plant material, the pre-portioned amount can be reduced or increased with respect to its mass, so that the deviation of the mass of the partial bale from the target mass can be compensated and overall an average density of all the final bales can be achieved.

A different type of pressing system in accordance with the invention, which achieves the above-mentioned object, comprises a pressing device of the above-mentioned type and a vehicle for moving on an agricultural land, wherein the vehicle comprises a support apparatus on which the pressing device is arranged. The features described in connection with the pressing system explained above can also be implemented in this pressing system and vice versa.

The pressing device can be used in a mobile manner on the agricultural land via the vehicle and thus the processing of the plant material can be facilitated.

The vehicle advantageously has a traction drive.

In particular, the vehicle can be configured to be self-propelled and self-steering. The vehicle can autonomously drive on the agricultural land. The plant material contained thereon, loose or pre-portioned, in particular pre-compressed, can be taken up and output to pressed final bales.

The pressing systems in accordance with the invention have those advantages which have already been mentioned in connection with the explanation of the pressing device in accordance with the invention. Advantageous embodiments of the pressing systems result from advantageous embodiments of the pressing device in accordance with the invention.

As mentioned at the outset, the present invention also relates to a method.

A method in accordance with the invention that achieves the object mentioned at the outset for providing a final bale with a pressing device, in particular a pressing device of the aforementioned type, is characterized by the following steps:
  compressing plant material to form a first partial bale;
  compressing plant material to form at least one further partial bale;
  joining the partial bales with one another to form a final bale.

The advantages mentioned in connection with the explanation of the pressing device in accordance with the invention can be achieved by implementing the method. In particular, advantageous embodiments of the method result from advantageous embodiments of the pressing device in accordance with the invention and/or the pressing systems in accordance with the invention.

FIG. 1 shows an advantageous embodiment of a pressing system in accordance with the invention, which is denoted overall by the reference numeral 10. The pressing system 10 comprises in particular an advantageous embodiment of the pressing device in accordance with the invention, which is denoted by the reference numeral 12.

The pressing device 12 is used to compress plant material and to provide advantageously prepared bales for subsequent transport, hereinafter referred to as final bales 14.

The plant material is, in particular, plants which can be used as biomass and which have a high energy content, for example *Miscanthus* x *giganteus* ("*Miscanthus*") or corn. These plants are known as long-stemmed and have relatively long and thick stems. For this reason, there are high demands on the pressing device 12 in order to provide final bales 14 with the highest possible density with simultaneously as uniform dimensions as possible with low tolerances for the best possible utilization of transport and storage capacities.

The pressing system 10 comprises a vehicle 16 with a traction drive 18 for driving wheels 20. The vehicle 16 is designed such that it can be driven on agricultural land 22. The agricultural land 22 can in particular be the field itself on which the plants processed to form final bales 14 are cultured.

The vehicle 16 can be guided by an operator. Alternatively or in addition, it can be provided that the vehicle 16 is configured to be self-propelled and self-steering and can be driven autonomously over the agricultural land 22.

The pressing device 12 can also be configured to be autonomous. In particular, all processes of the pressing system 10 and thus also the pressing device 12 can be controlled by means of a control apparatus 24.

The plant material harvested from the agricultural land 22 is pre-portioned by means of a portioning apparatus 26 of the pressing system 10 before being supplied into the pressing device 12. The portioning apparatus 26 provides a pre-portioned amount 28 of plant material. For this purpose, the portioning apparatus 26 comprises a compression unit 30. With the compression unit 30, the plant material is pre-compressed and provided in the form of a pre-bale 32.

The portioning apparatus 26 is in particular designed such that preferably a pre-bale 32 of predefined dimensions and/or a pre-bale 32 with a predetermined mass is provided. To control the mass, the portioning apparatus 26 can comprise a sensor apparatus 34 which makes it possible to determine the mass of the drawn-in plant material which is processed to form a pre-bale 32.

It can be provided that the portioning apparatus 26 is a component of a vehicle, not shown in the drawing, which travels ahead of the vehicle 16 in a working direction.

The pre-bales 32 deposited on the agricultural land 22 can be taken up from the agricultural land 22 by means of a supply apparatus 36 of the pressing system 10. In this case, the pre-bales 32 are lifted and transported via a transport path 38 in the direction of a supply opening 40 of the pressing device 12. The transport path 38 comprises, for example, a belt conveyor.

The pressing device 12 itself is positioned on a support apparatus 42 of the vehicle 16.

Figure 2:
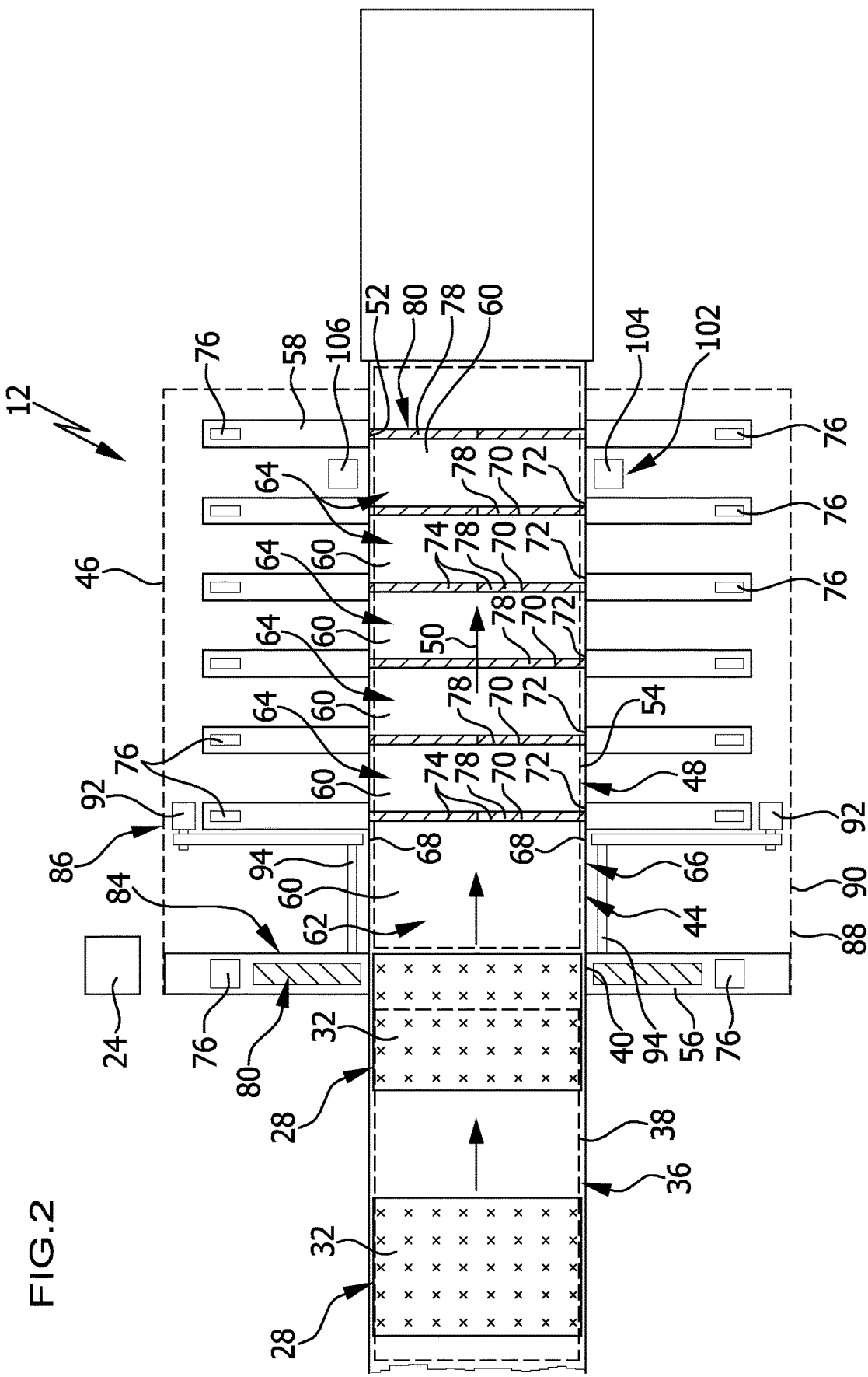
FIG. 2: shows a schematic view of the pressing device from FIG. 1 in a plan view, wherein pre-bales are compressible with the pressing device to form partial bales and the latter are connectable to form a final bale.

As can be seen in particular from FIG. 2, the pressing device 12 comprises a pressing chamber 44, which can be surrounded, for example, by a housing 46 shown in FIG. 2. A transport apparatus 48 is arranged in the pressing chamber 44 in order to enable the transport of the pre-bales 32, the partial bales and the final bale 14 along a working direction 50 of the pressing device 12. The working direction 50 extends straight from the supply opening 40 to an output opening 52 of the pressing chamber 44. For example, the transport apparatus 48 comprises a transport path 54, for example with a belt conveyor.

The pressing chamber 44 has a front wall 56, in which the supply opening 40 is formed, and a rear wall 58 in which the output opening 52 is formed.

The pressing chamber 44 comprises a plurality of successive pressing chamber sections 60 arranged one behind the other in the working direction 50. In the supply direction of the pre-bales 32, a first pressing chamber section 60 is formed by a pressing space 62. Following spaces 64, each forming a pressing chamber section 60, adjoin the pressing space 62. In the present case, five following spaces 64 and thus six pressing chamber sections 60 are present.

The pressing chamber 44 has a pressing box 66 which extends from the front wall 56 to the rear wall 58. The pressing box 66 is delimited on a bottom side by the transport apparatus 48. Laterally, transverse to the working direction 50 and upward, the pressing box 66 is delimited by a boundary 68. The boundary 68 can be a wall. However, it is conceivable in particular that the boundary 68 is formed by profiles or the like that have a distance from one another, which allow compression of the pre-bales 32 without plant material escaping from the pressing box 66.

In the pressing box 66, intermediate walls 70 are arranged, which separate the pressing space 62 and the following spaces 64 from one another. A first intermediate wall 70 separates the pressing space 62 from the first following space 64. A further intermediate wall 70 is arranged in each case between adjacent following spaces 64.

A respective transport opening 72 between the pressing space 62 and the first following space 64 or between adjacent following spaces 64 can be selectively opened and closed with a respective intermediate wall 70.

In the present example, each intermediate wall 70 comprises two segments 74 which can be pushed in towards each other into the pressing box 66 transversely to the working direction 50. Resting against each other, the segments 74 close the pressing box 66 in the region of the respective transport opening 72.

Conversely, the segments 74 can be displaced out of the pressing box 66 in directions pointing away from one another transversely to the working direction 50, so that the respective transport opening 72 is released and transport of partial bales from the pressing space 62 into the first following space 64 or between the following spaces 64 is possible.

Drive apparatuses 76 are provided for moving the respective segments 74.

In a respective closed position, the respective intermediate wall 70 can serve as an abutment 78 during the compression of plant material, which will be discussed below.

In a similar manner, a closing apparatus 80 is provided in the output opening 52 of the rear wall 58, with which the output opening 52 is closed in a closed position and is released in an open position. The closing apparatus 80 comprises two segments 74 which can be displaced toward one another by means of a drive apparatus 76 for closing the pressing chamber 44. Conversely, the segments 74 can be displaced away from one another in order to release the output opening 52 from the pressing box 66. The closing apparatus 80 forms an abutment 78 which delimits the last following space 64.

A closing apparatus 82 is provided on the supply opening 40. With the closing apparatus 82, the supply opening 40 can be closed in a closed position. In an open position, the supply opening 40 is released. The closing apparatus 82 also comprises segments 74 which can be displaced toward one another transversely to the working direction 50 in order to assume the closed position. Conversely, the segments 74 can be displaced in directions pointing away from one another in order to release the supply opening 40 and thereby open the pressing chamber 44 and in particular the pressing space 62.

The pressing device 12 comprises a pressing element 84. In the present case, the pressing element 84 is formed by the front wall 56 including the closing apparatus 82 comprised thereby. The pressing element 84 can be moved in the working direction 50 and in the opposite direction by means of drive apparatuses 86. To compress pre-bales 32, the pressing element 84 is moved from an initial position 88 to an end position 90. This reduces the pressing space 62.

Pre-bales 32 contained in the pressing space 62 are compressed to form a partial bale.

Figure 12:
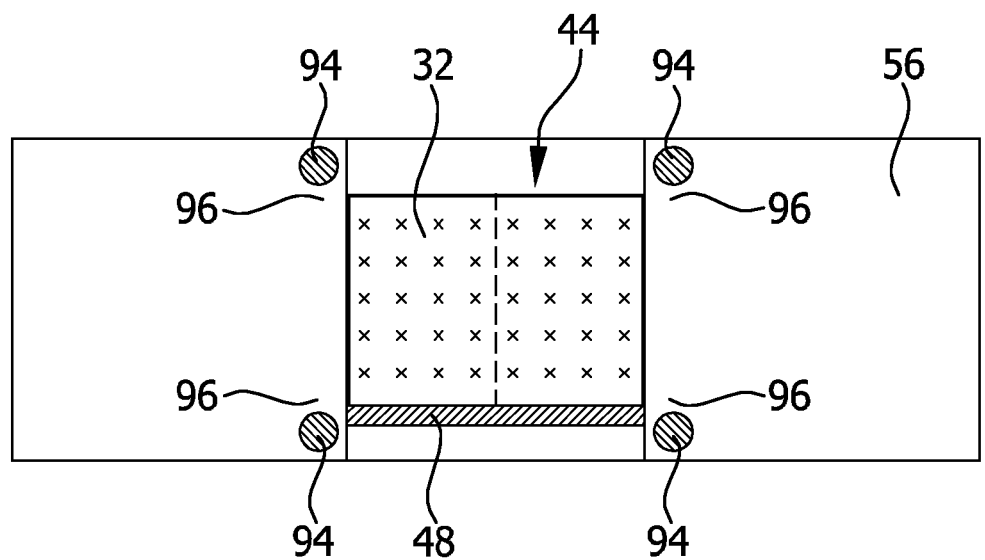
FIG. 12 shows a view along the line 12-12 in FIG. 4.

In the present case, four drive apparatuses 86 are provided. The drive apparatuses 86 each comprise a drive element 92 and spindle drives 94. A respective spindle drive 94 is arranged on a corner region 96 of the supply opening 40 (FIG. 12). The drive elements 92 are synchronized with one another in such a way that they can be activated and deactivated together. When the pressing element 84 is displaced, a tilt-free movement with regard to an optimal compression of the pre-bale 32 can be achieved in this way. It is understood that the pressing device 12 for the pressing element 84 can comprise a guide apparatus which is not shown in the drawing.

With the pressing device 12, the use of spindle drives 94 offers the possibility of achieving a degree of compression for the plant material which considerably exceeds the degree of compression that can be achieved using conventional presses, in particular piston presses. For example, densities of the final bales 14 of up to approximately 400 kg/m$^3$ are conceivable.

In addition, the pressing device 12 has the advantage that, by means of the configuration of the pressing element 84 and the use of the spindle drives 94 and with pressing of the pre-bales 32, partial bales 98 with a pre-defined length can be pressed, which partial bales 32 have only a small tolerance. In comparison with conventional piston presses, a significantly higher precision can be achieved when pressing bales.

Accordingly, it is advantageous if the initial position 88 and the end position 90 are predetermined at the pressing device 12, so that partial bales 98 can be pressed with substantially identical length. Accordingly, final bales 14 can differ depending on the nature—for example moisture—of the supplied plant material, for example with regard to its weight and its average density.

In order to ensure that the final bale 14 comprises the smallest possible dimensional tolerances, the pressing box 66 has a substantially identical cross section over the entire length. In particular, the cross-sectional area of the pressing space 62 corresponds to the cross-sectional area of the following spaces 64.

The following spaces 64 are of identical length along the working direction 50. The length of the pressing space 62, when the end position 90 is assumed by the pressing element 84, corresponds in this case to a length of the following spaces 64.

The length of the pressing space 62, when the initial position 88 is assumed by the pressing element 84, preferably corresponds to a length of the pre-bales 32 along the working direction 50.

The length of the respective following space 64 and of the pressing space 62, in the end position 90 of the pressing element 84, preferably corresponds to an even fraction of an internal dimension of a container in accordance with the standard ISO 668, in particular a 20-foot container. For example, a partial bale 98 formed in this way has a length of approximately 33 cm. A final bale 14 comprising six partial bales 98 has a length of approximately 196 cm, corresponding to approximately one third of the internal dimension of the 20-foot container.

A width and/or a height of the pressing box 66, in relation to its interior dimension, preferably likewise corresponds to an even fraction of a container in accordance with the standard ISO 668, especially the 20-foot container.

For example, the width of the pressing box 66 is approximately 116 cm, so that this width also corresponds to that of the final bale 14. This corresponds approximately to half the width of an internal dimension of the container.

For example, the height of the pressing box 66 is approximately 79 cm. This corresponds to the height of the final bale 14. The height of the final bale 14 thus corresponds to approximately one third of the interior dimension of the container in height.

As a result, a final bale 14 can advantageously be provided with the pressing device 12, which final bale is dimensioned in three spatial directions such that a plurality of final bales 14 can be arranged in a positive locking manner in a standardized ISO 668-compliant container and existing and standardized transport capacities are utilized as optimally as possible.

A preferred mode of operation of the pressing device 12 is described below with reference to FIGS. 2 to 11, also with regard to a preferred exemplary embodiment of the method in accordance with the invention. FIGS. 2 to 11 show successive work steps which are carried out with the pressing device 12. The dashed line 100 between FIGS. 9 and 10 symbolizes that, in particular between these two figures, some of the working steps are carried out, but are not shown.

First, the supply opening 40 is released when the closing apparatus 82 is open, in order to supply a first pre-bale 32. The intermediate walls 70 and the closing apparatus 80 are preferably closed (FIG. 2).

Figure 3:
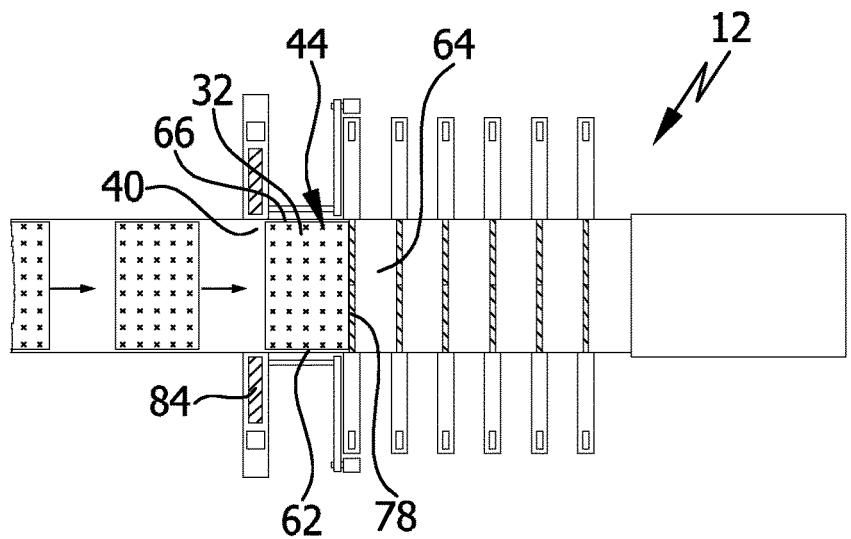
Figure 4:
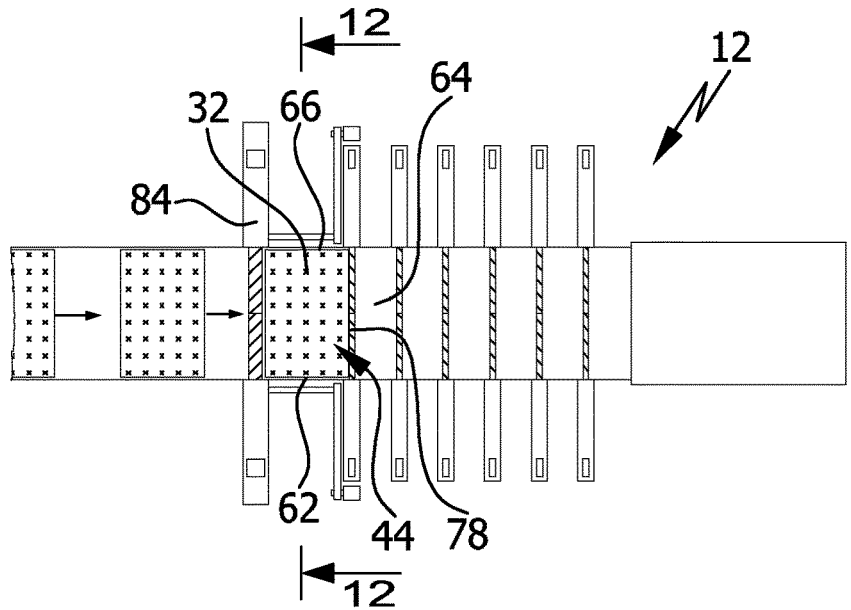
Figure 5:
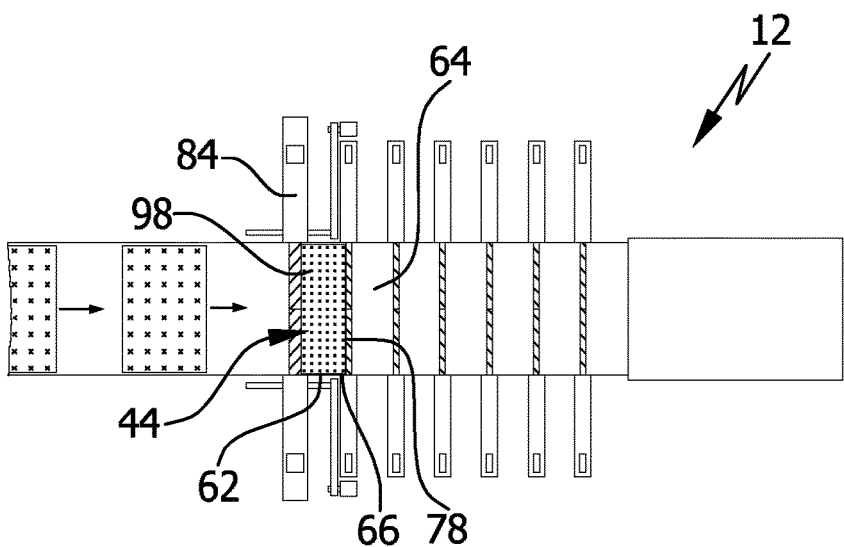

After the first pre-bale 32 has been inserted, the closing apparatus 82 is closed for closing the pressing space 62. The pressing element 84 assumes the initial position 88 (FIGS. 3 and 4).

Subsequently, the drive apparatus 86 is activated to displace the pressing element 84 from the initial position 88 into the end position 90. In this case, the pressing space 62 is reduced. The pre-bale 32 is compressed against the first abutment 78 to form a partial bale 98. In this case, the abutment 78 is the first intermediate wall 70.

In doing so, the plant material is highly compacted. The partial bale 98 can have a mean density of up to approximately 400 kg/m$^3$. The length is preferably approximately 33 cm. The width is preferably approximately 116 cm. The height is preferably approximately 79 cm.

Figure 6:
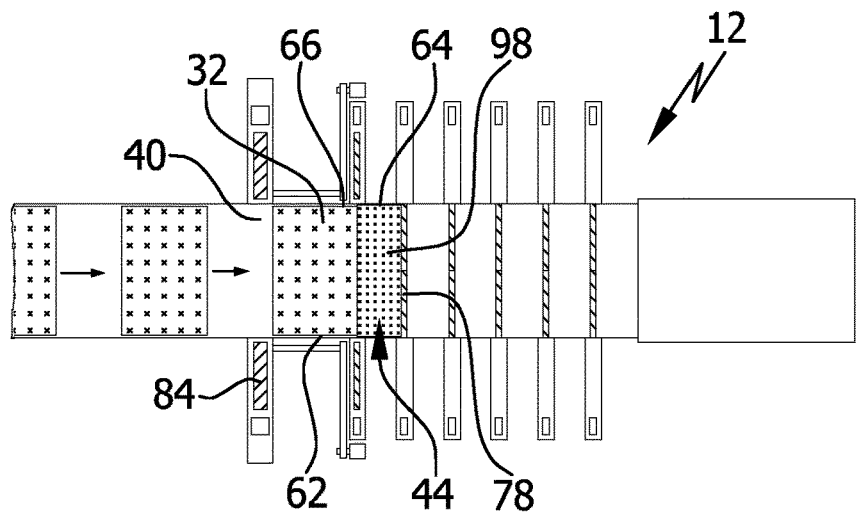

Subsequently, the first intermediate wall 70 is opened from the pressing space 62 into the first following space 64 and the first partial bale 98 is transported through the transport opening 72 into the first following space 64. At the same time, the next pre-bale 32 can preferably be supplied (FIG. 6).

Figure 7:
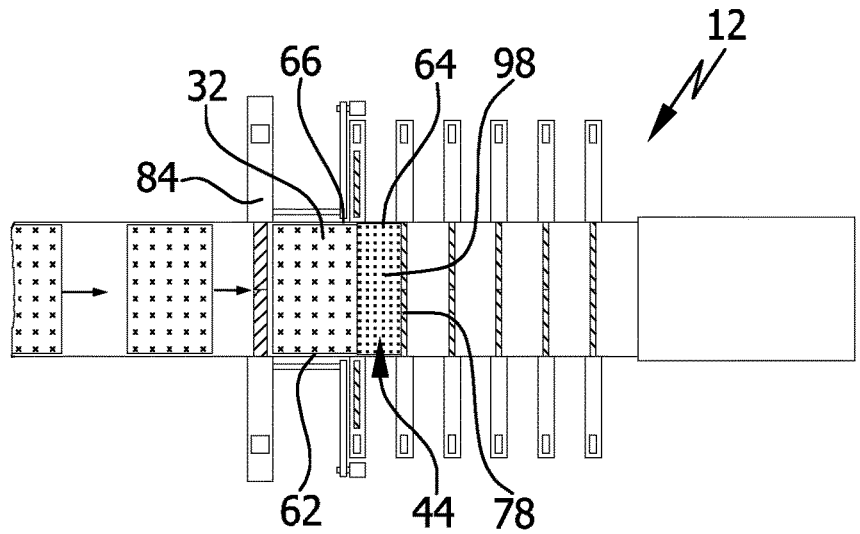

In the subsequent pressing process for forming the second partial bale 98, the intermediate wall 70 between the first and second following space 64 is used as an abutment 78. The second pre-bale 32 is compressed against the first partial bale 98 (FIGS. 7 and 8).

This has the advantage, for example, that if the first partial bale 98 has expanded, it is recompressed. In addition, a connection of the partial bales 98 can already take place, for example, by interlacing the plant material.

Figure 8:
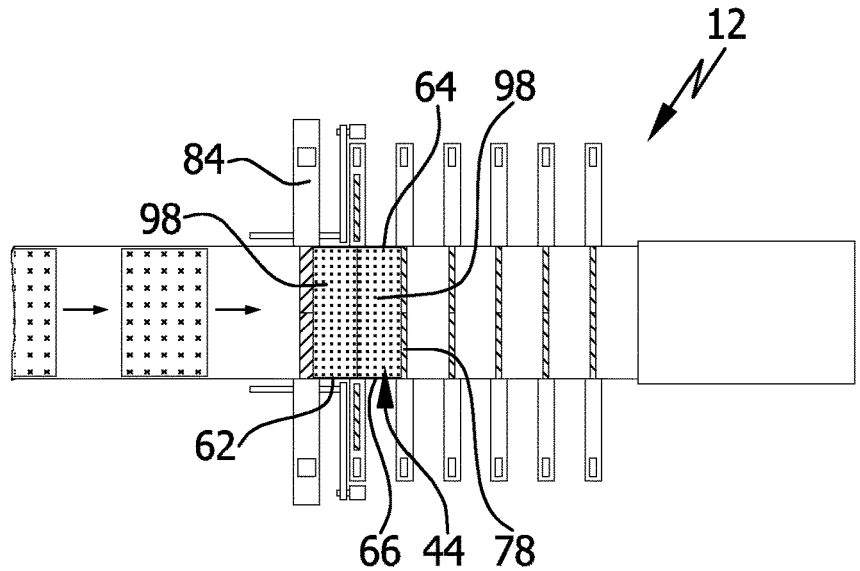

FIG. 9 shows the compression of the third partial bale 98 and corresponds to the depiction of FIG. 8 after a further compression operation.

In a corresponding manner, FIG. 10 shows the compression of the sixth partial bale 98.

It can be seen in each case that a different one of the intermediate walls 70 is used as an abutment 78. After a compression operation, this intermediate wall 70 is opened. The partial bales 98 are transported into the respective next following space 64, wherein the last compressed partial bale 98 is transported from the pressing space 62 into the first following space 64.

Deviating from the aforementioned information, the closing apparatus 80 in the rear wall 58 serves as an abutment 78 (FIG. 10) for the compression of the last partial bale 98. However, also in this case, the first partial bale 98 is in contact with the abutment 78. The partial bales 98 provided in each case abut against one another, and the respective pre-bale 32 is compressed against the last-formed partial bale 98.

The partial bales 98 adhere to one another even without additional bonding, for example by the plant material interlacing with each other. However, it is advantageous that the pressing device 12 comprises a binding apparatus 102. The binding apparatus 102 comprises a first binding unit 104 and a second binding unit 106. The binding units 104, 106 are shown schematically in FIGS. 2 and 11.

The binding apparatus 102 is in particular a strapping apparatus in order to strap the six partial bales 98. It is advantageous that the binding apparatus 102 is arranged at the pressing chamber 44. This makes it possible to join the partial bales 98 to the final bale 14 already in the pressing chamber 44, even before the final bale 14 is output from the pressing chamber 44 via the output opening 52.

The binding units 104, 106 are arranged, for example, on opposite sides of the pressing box 66. After pressing the last partial bale 98, the binding units 104, 106 can be inserted, for example, transversely to the working direction 50 into the pressing box 66.

In particular, straps made of metal, for example steel straps, are used as binding material. The straps of both binding units 104, 106 are advantageously supplied in such a way that they encircle the partial bales 98. The straps can be connected to one another by means of force and/or positive engagement, for example by means of clinching.

After binding, the bound final bale 14 is output from the pressing chamber 44 via the output opening 52 (FIG. 11).

In the following, advantageous embodiments of the pressing device in accordance with the invention are shown schematically in FIGS. 13 and 14, on the one hand, and FIGS. 15 and 16, on the other hand, and are denoted by the reference numerals 110 and 130, respectively. The pressing devices 110, 130 can be used in the pressing system 10 instead of the pressing device 12.

The advantages achievable with the pressing device 12 can also be achieved with the pressing devices 110, 130, so that reference is made in this regard to the above descriptions. Only the essential differences are described.

Figure 13:
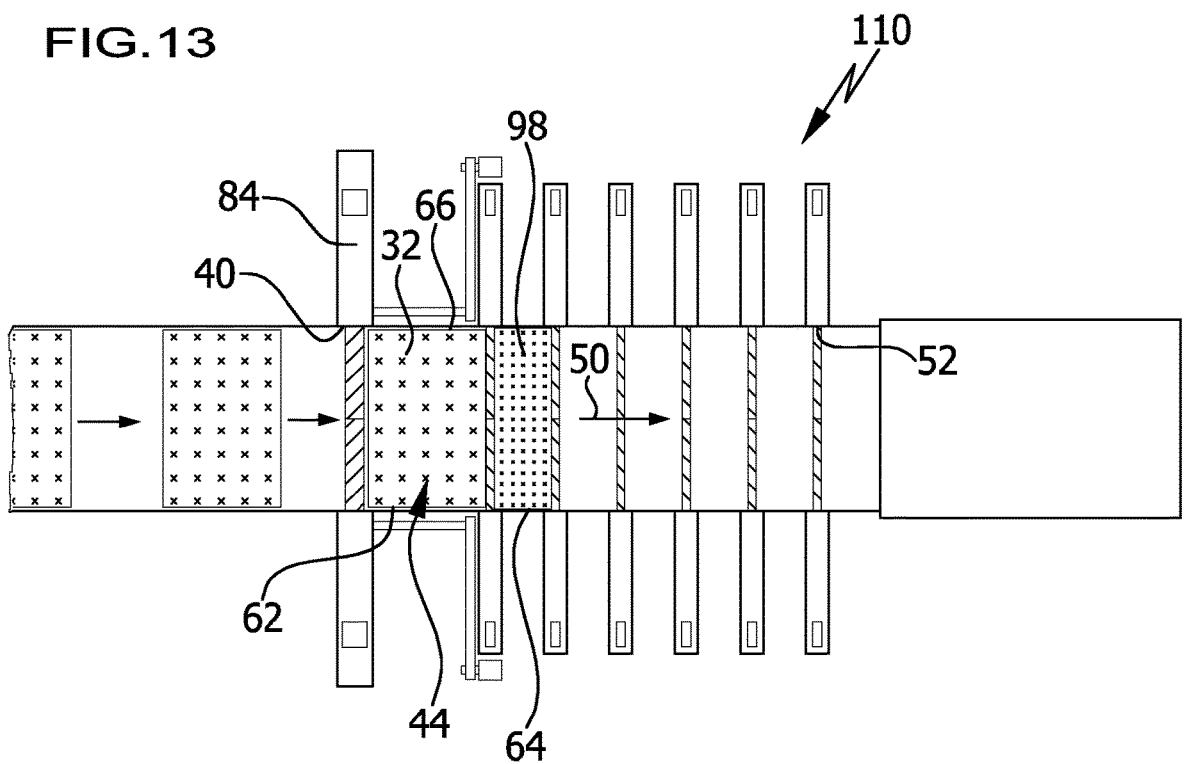
FIGS. 13 and 14: show a view similar to FIG. 2 of a further preferred embodiment of the pressing device in accordance with the invention at successive points in time.
Figure 14:
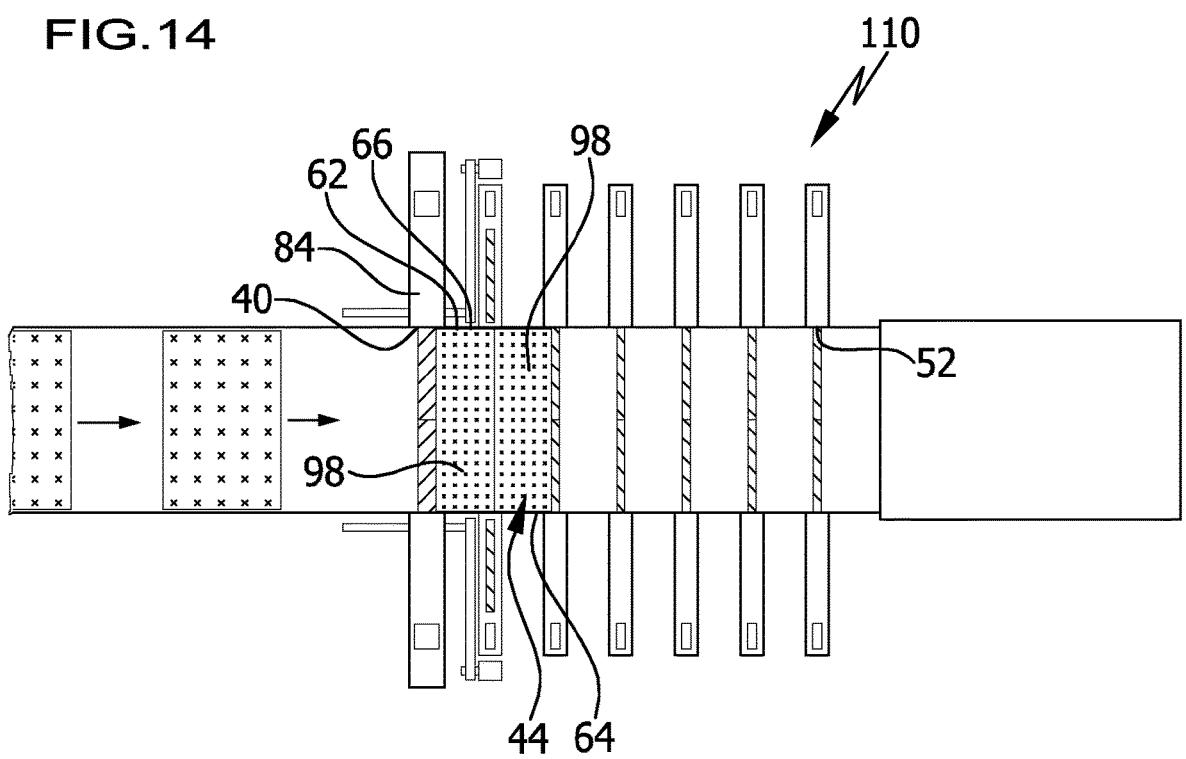

The pressing device 110 in accordance with FIGS. 13 and 14 provides that the first intermediate wall 70 between the pressing space 62 and the first following space 64 acts as an abutment 78 for compressing a pre-bale 32. This becomes clear in particular from the comparison of FIGS. 8 and 13. Accordingly, after the compression, the first partial bale 98 is transported into the first following space 64 and the intermediate wall 70 in front of it is closed (FIG. 13). After the compression, the first intermediate wall 70 is opened again, and the second partial bale 98 is displaced against the first partial bale 98 (FIG. 14).

Subsequently, a further one of the second and following intermediate walls 70 is opened successively. The first intermediate wall 70 is closed again to form the abutment 78 when the partial bales 98 have been removed from the pressing space 62 to compress the next pre-bale 32.

Figure 15:
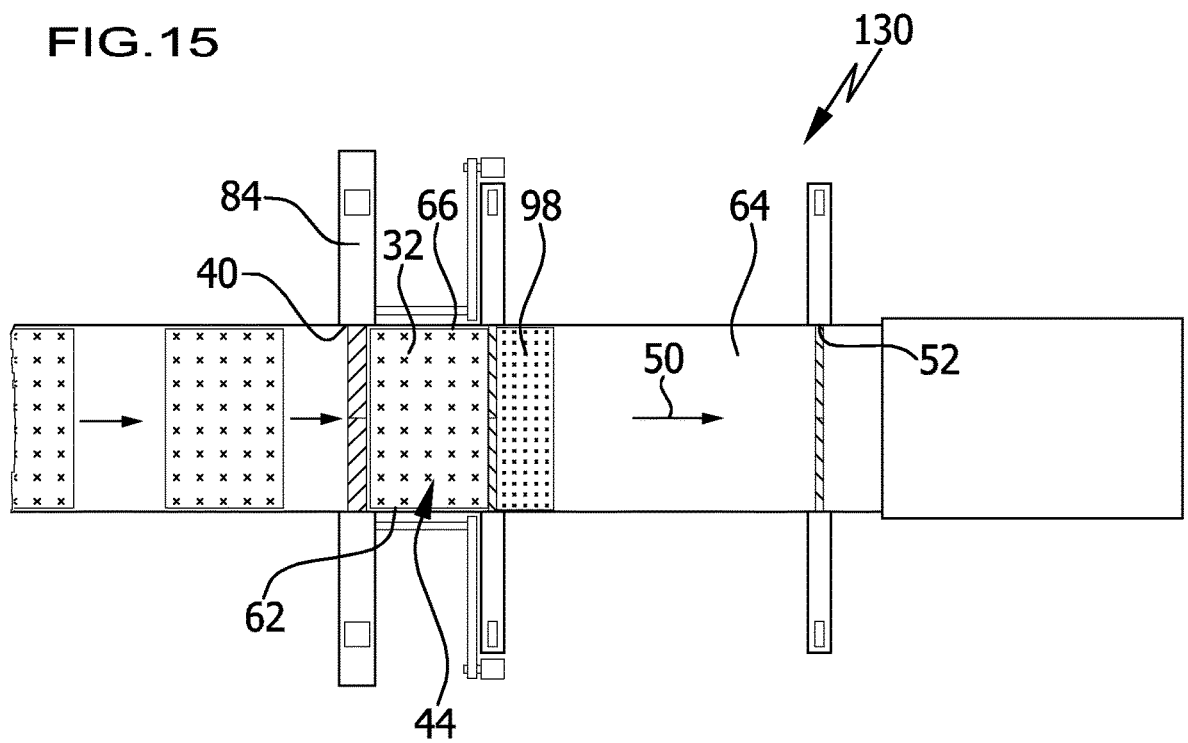
FIGS. 15 and 16: show a further schematic depiction of a preferred embodiment of the pressing device in accordance with the invention at successive points in time.
Figure 16:
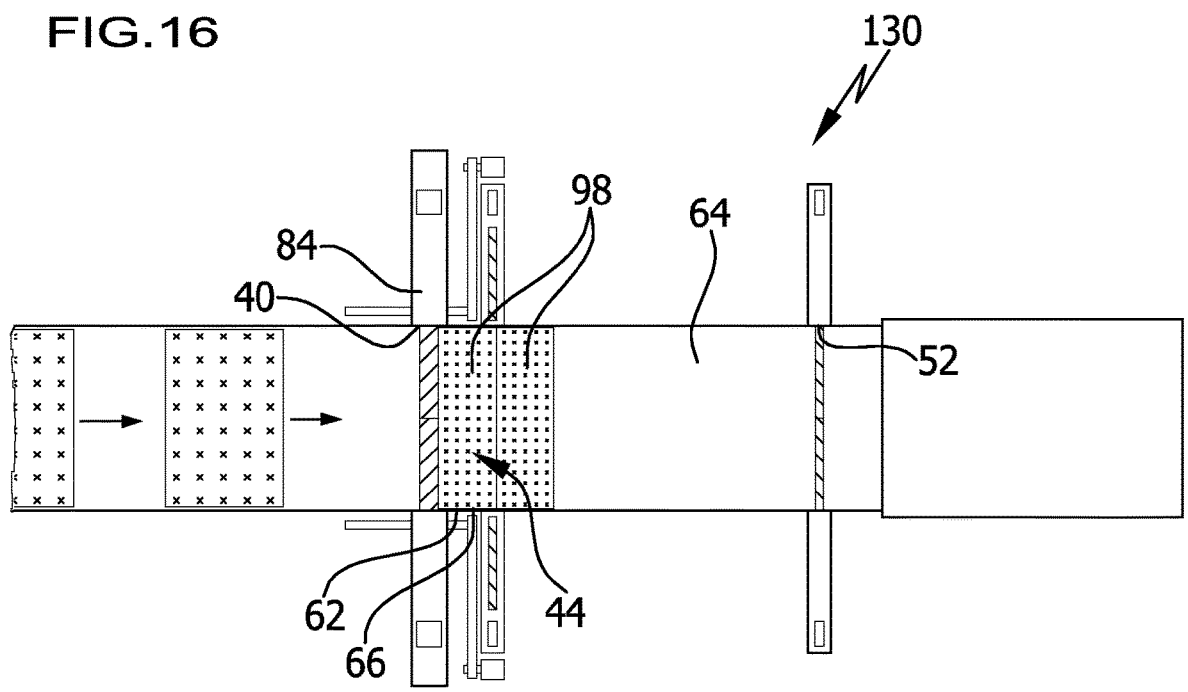

A simplified embodiment of the pressing device 130 in FIGS. 15 and 16 also provides that the respective pre-bale 32 is compressed against the first intermediate wall 70 at the pressing space 62, which serves as an abutment 78, to form the first and each subsequent partial bale 98.

In contrast to the pressing device 110, only one following space 64 is provided, which, in its extension along the working direction 50, corresponds, for example, to the extension of the following spaces 64 of the pressing device 110.

When the intermediate wall 70 is open, the partial bale 98 last-formed in each case is transported into the following space 64 through the transport opening 72. The intermediate wall 70 is closed for the following compression.

In the case of the pressing devices 110 and 130, the partial bales 98 are also joined with one another by means of the binding apparatus 102 in the pressing chamber 44 before the bound final bale 14 is output via the output opening 52.

The pressing device 130 is characterized by a structurally simple configuration. With the pressing device 110, a widening of the partial bale 98 is prevented by the respectively closed intermediate walls 70, especially since the length of the respective following space 64 corresponds to the length of the partial bale 98. With the pressing device 12, in which a different abutment 78 for the compression is used in each case, the partial bales 98 are pressed against one another for connecting.

LIST OF REFERENCE NUMERALS

10 Pressing system
12, 110, 130 Pressing device
14 Final bale
16 Vehicle
18 Traction drive
20 Wheel
22 Agricultural land
24 Control apparatus
26 Portioning apparatus
28 Pre-portioned amount
30 Compression unit
32 Pre-bale
34 Sensor apparatus
36 Supply apparatus
38 Transport path
40 Supply opening
42 Support apparatus
44 Pressing chamber
46 Housing
48 Transport apparatus
50 Working direction
52 Output opening
54 Transport path
56 Front wall
58 Rear wall
60 Pressing chamber section
62 Pressing space
64 Following space
66 Pressure box
68 Boundary
70 Intermediate wall
72 Transport opening
74 Segment
76 Drive apparatus
78 Abutment
80, 82 Closing apparatus
84 Pressing element
86 Drive apparatus
88 Initial position 90 End position
92 Drive element
94 Spindle drive
96 Corner region
98 Partial bale
100 Dashed line
102 Binding apparatus
104, 106 Binding unit

The invention claimed is:

1. A pressing device for plant material for providing a bale made from the plant material, said pressing device comprising:
   a pressing chamber having a pressing space to which plant material is supplied by a supply apparatus via a supply opening,
   a pressing element, which is movable from an initial position into an end position having a drive apparatus for compressing the plant material,
   and a binding apparatus, wherein
   the pressing space is laterally delimited by a pressing box, and a first abutment delimits the pressing space against which the plant material is compressible during the movement of the pressing element to form a first partial bale,
   the first partial bale provided by compressing the plant material against the first abutment is transportable through a transport opening of the pressing space into a following space,
   at least one further partial bale is providable by the pressing element by compressing further plant material introduced into the pressing space against at least one second abutment arranged on the pressing chamber,
   the first abutment for providing the first partial bale and the at least one second abutment for providing the at least one further partial bale are abutments which are different from one another,
   the at least one second abutment and the pressing box delimit the following space and the further plant material is compressible against the first partial bale supported on the at least one second abutment to form the at least one further partial bale,
   the partial bales are output via an output opening of the pressing chamber, and
   the two or more partial bales are connectable to form a final bale by of the binding apparatus.

2. The pressing device in accordance with claim 1, wherein the pressing device comprises a transport apparatus whereby the partial bales are transportable from the pressing space into at least one following space to the output opening of the pressing chamber.

3. The pressing device in accordance with claim 1, wherein the partial bale and the at least one further partial bale are transportable from the pressing space to the output opening in a working direction of the pressing device, which is defined by the pressing box.

4. The pressing device in accordance with claim 1, wherein the pressing device comprises two or more following spaces arranged one behind the other in a working direction of the pressing device and two or more second abutments, wherein a respective second abutment thereof delimits the respective following space on which respective abutment the first partial bale is supported during the formation of the further partial bales, and wherein the further plant material is compressible in the pressing space against the respective last-formed partial bale.

5. The pressing device in accordance with claim 1, wherein the pressing chamber comprises the pressing space as a pressing chamber section and a respective following space as further pressing chamber sections following the pressing space in a working direction of the pressing device, wherein the output opening of the pressing chamber for the partial bales, bound to a final bale, is arranged on a last pressing chamber section with respect to the working direction.

6. The pressing device in accordance with claim 1, wherein the first abutment at the pressing space is an intermediate wall between the pressing space and the following space and is transferable by a drive apparatus from a closed position, in which the plant material is compressible against the intermediate wall, into an open position, in which the partial bale is transportable into the following space, and vice versa.

7. The pressing device in accordance with claim 1, wherein at least one of the following applies:
   the at least one second abutment between adjacent following spaces is in each case an intermediate wall between the following spaces and is transferable by a drive apparatus from a closed position, in which the first partial bale is supportable against the intermediate wall, into an open position, in which the first partial bale is transportable into the next following space, and from the open position into the closed position;
   the at least one second abutment at a last following space in a working direction of the pressing device is a closing apparatus of a rear wall of the pressing chamber and is transferable by a drive apparatus from a closed position closing the output opening of the pressing chamber, in which the first partial bale is supported against the closing apparatus, into an open position releasing the output opening, and from the open position into the closed position, in which open position the partial bales are transportable out of the pressing chamber.

8. The pressing device in accordance with claim 1, wherein at least one of the following applies:
   an intermediate wall or a closing apparatus is movable out of the pressing box as a whole or in individual, respectively movable segments transversely to a working direction of the pressing device for transfer from a closed position to an open position and from the open position to the closed position;
   the first abutment on the pressing space and the at least one second abutment are stationary on the pressing device with respect to a movement in a working direction of the pressing device.

9. The pressing device in accordance with claim 1, wherein the pressing box has an identical or substantially identical cross-sectional area at the pressing space and at the following space.

10. The pressing device in accordance with claim 1, wherein the following space, is designed shorter than the pressing space in a working direction of the pressing device.

11. The pressing device in accordance with claim 1, wherein the partial bales are formed in the pressing space with a predetermined or predeterminable path of the pressing element from the initial position into the end position.

12. The pressing device in accordance with claim 1, wherein
   a length of at least one following space following the pressing space in a working direction of the pressing device, is equal to the length of the partial bale, defined by a range of movement of the pressing element from the initial position into the end position, and/or two or more following spaces are provided which are of equal length along a working direction of the pressing device.

13. The pressing device in accordance with claim 1, wherein at least one of the following applies to an interior dimension of the pressing space or the pressing box:
the pressing space, in the end position of the pressing element, has a length which corresponds approximately to an integer fraction of an internal dimension of a container of the ISO standard 668 for containers;
the pressing box has a width which corresponds approximately to an integer fraction of an internal dimension of a container of the ISO standard 668 for containers;
the pressing box has a height which corresponds approximately to an integer fraction of an internal dimension of a container of the ISO standard 668 for containers;
wherein the container is a 20-foot container or a 40-foot container of the ISO standard 668.

14. The pressing device in accordance with claim 1, wherein at least one of the following applies:
the final bale has a length which corresponds approximately to an integer fraction of an internal dimension of a container of the ISO standard 668 for containers;
the final bale has a width which corresponds approximately to an integer fraction of an internal dimension of a container of the ISO standard 668 for containers;
the final bale has a height which corresponds approximately to an integer fraction of an internal dimension of a container of the ISO standard 668 for containers.

15. The pressing device in accordance with claim 1, wherein at least one of the following applies:
the drive apparatus for the pressing element is configured mechanically, electrically, hydraulically, pneumatically or by a combination thereof;
the drive apparatus comprises at least one spindle drive, wherein spindles coupled with the pressing element are arranged laterally next to the supply opening.

16. The pressing device in accordance with claim 1, wherein the pressing chamber comprises a front wall in which the supply opening is formed and which comprises or forms the pressing element, wherein a closing apparatus is provided, which is transferable by a drive apparatus into an open position, for supplying the plant material into the pressing space, and which closes the supply opening in a closed position, and wherein the front wall is movable by the drive apparatus for compressing the plant material.

17. The pressing device in accordance with claim 16, wherein the closing apparatus is movable completely or in individual, respectively movable segments transversely to a working direction of the pressing device for transfer from the closed position to the open position and vice versa.

18. The pressing device in accordance with claim 1, wherein at least one of the following applies:
the binding apparatus is a strapping apparatus;
the binding apparatus is arranged at the pressing chamber and wherein the final bale is providable in the pressing chamber by binding the partial bales.

19. The pressing device in accordance with claim 1, wherein the binding apparatus comprises a first binding unit and a second binding unit which are insertable into the pressing box from opposite sides, wherein at least one strand or strap is providable by each binding unit, wherein the strands or straps of different binding units are connected to one another encircling the final bale.

20. The pressing device in accordance with claim 19, wherein the straps are metal straps which are connectable to one another in a force-locking and/or positive-locking manner.

21. The pressing device in accordance with claim 3, wherein the working direction of the pressing device is straight.

22. A pressing device for plant material for providing a bale made from the plant material, said pressing device comprising:
a pressing chamber having a pressing space to which plant material is supplied by a supply apparatus via a supply opening,
a pressing element, which is movable from an initial position into an end position having a drive apparatus for compressing the plant material,
and a binding apparatus, wherein
the pressing space is laterally delimited by a pressing box, and a first abutment delimits the pressing space against which the plant material is compressible during the movement of the pressing element to form a first partial bale,
the first partial bale provided by compressing the plant material against the first abutment is transportable through a transport opening of the pressing space into a following space,
at least one further partial bale is providable by Beans of the pressing element by compressing further plant material introduced into the pressing space against at least one second abutment arranged on the pressing chamber,
wherein the first abutment for providing the first partial bale and the at least one second abutment for providing the at least one further partial bale are identical, wherein each partial bale is formed by compression of the plant material in the pressing space against the first abutment and is subsequently transported into the following space,
the partial bales are output via an output opening of the pressing chamber, and
the two or more partial bales are connectable to form a final bale by the binding apparatus.

23. The pressing device in accordance with claim 22, wherein
a predetermined number of partial bales is collected in the following space and subsequently, bound as a final bale, is output through the output opening, or
the pressing device comprises two or more following spaces arranged one behind the other in a working direction of the pressing device, which following spaces are separated from one another by intermediate walls, wherein the respective next intermediate wall is released after a respective partial bale has been formed and the partial bales are transportable into the respective next following space.

24. A pressing system comprising a pressing device for plant material for providing a bale made from the plant material and a portioning apparatus upstream of the pressing device in a working direction of the pressing device, via which portioning apparatus a pre-portioned amount of plant material is providable to the pressing device for forming a respective partial bale, the pressing device comprising:
a pressing chamber having a pressing space to which plant material is supplied by a supply apparatus via a supply opening, a pressing element, which is movable from an initial position into an end position having a drive apparatus for compressing the plant material, and a binding apparatus, wherein the pressing space is laterally delimited by a pressing box, and a first abutment delimits the pressing space against which the plant material is compressible during the movement of the pressing element to form a first partial bale, the first partial bale provided by compressing the plant against the first abutment is transportable through a transport opening of the pressing space into a following space, at least one further partial bale is providable by the pressing element by compressing further plant material introduced into the pressing space against at least one second abutment arranged on the pressing chamber, the first abutment for providing the first partial bale and the at least one second abutment for providing the at least one further partial bale are abutments which are different from one another, the at least one second abutment and the pressing box delimit the following space and the further plant material is compressible against the first partial bale supported on the at least one second abutment to form the at least one further partial bale, the partial bales are output via an output opening of the pressing chamber, and the two or more partial bales are connectable to form a final bale by the binding apparatus.

25. The pressing system in accordance with claim 24, wherein the pre-portioned amount of plant material is specifiable with respect to its volume and/or with respect to its weight.

26. The pressing system in accordance with claim 24, wherein the portioning apparatus comprises a compression unit for precompression of the pre-portioned amount of plant material, in the form of a pre-bale.

27. The pressing system in accordance with claim 24, wherein the pressing system comprises at least one sensor apparatus whereby at least one of the following is determinable:

a mass of the pre-portioned amount of plant material prior to introduction into the pressing space;

a mass of a formed partial bale in the pressing chamber.

28. The pressing system in accordance with claim 27, wherein the portioning apparatus is controllable as a function of the determined mass of the partial bale for providing the pre-portioned amount of plant material, with regard to a predetermined or predeterminable average density of the final bales.

29. The pressing system; in accordance claim 24, comprising a vehicle for driving on agricultural land, wherein the vehicle comprises a support apparatus on which the pressing device is arranged, and wherein the vehicle comprises a traction drive, or the vehicle is configured to be self-propelled and self-steering.

* * * * *